March 4, 1958 J. A. DALEY, JR., ET AL 2,825,226
COMBUSTIBLE GAS DETECTOR
Filed Aug. 25, 1954 2 Sheets-Sheet 1
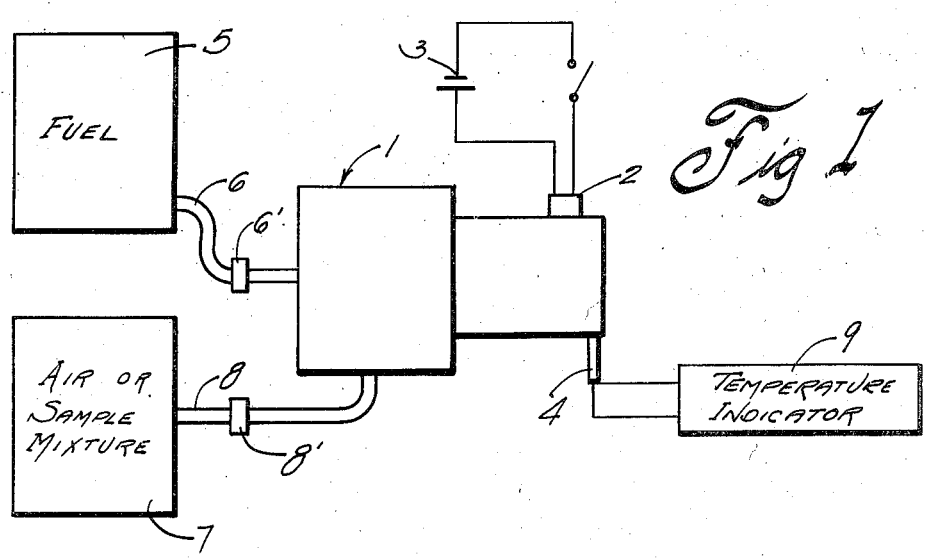
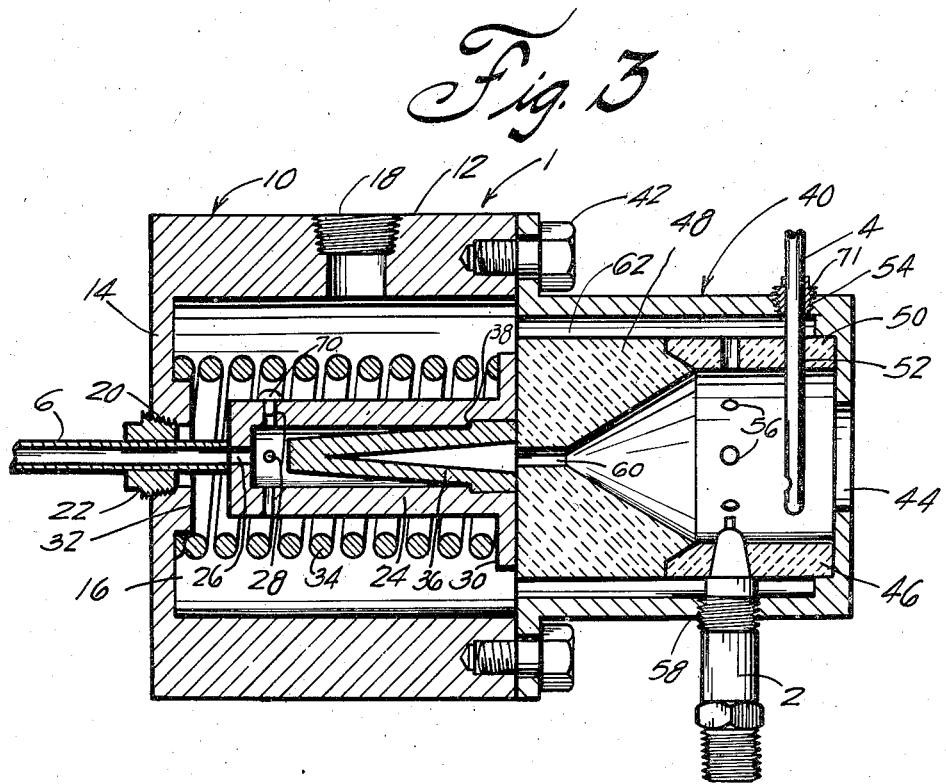
INVENTOR.
JOSEPH A. DALEY JR.
WILLIAM R. SLIVKA
BY
ATTORNEYS ated Mar. 4, 1958

2,825,226

COMBUSTIBLE GAS DETECTOR

Joseph A. Daley, Jr., Burlington County, and William Reginald Slivka, Mercer County, N. J.

Application August 25, 1954, Serial No. 452,233

5 Claims. (Cl. 73—190)

(Granted under Title 35, U. S. Code (1952), sec. 266)

The invention described herein may be manufactured and used by or for the Government of the United States of America for governmental purposes without the payment of any royalties thereon or therefor.

This invention is concerned with the art or devices for measuring the combustibility of gas mixtures.

In the many fields of industrial endeavor including research, production and transportation, there arises quite often an environment that is capable of being dangerous to men, materials and equipment due to the presence of a gas mixture which is potentially combustible or explosive. Such situations may arise where fuels are being produced, transported, developed or evaluated, or when devices using fuels are primarily involved. Such dangerous situations may in fact arise whenever any sort of explosive or combustible gas or volatile liquid is being utilized for any purpose whatsoever. An added complication exists in that quite often in normally safe environments there may be a sudden build up or even a gradual build up to a danger point of gas mixtures containing these dangerous gases. In the absence of an accurate means to detect the presence of such gases, the personnel in such an environment may be unaware of their situation and will fail to take proper precautions or will even actually do something to explode or ignite them. On the other hand, the provision of a simple, durable device which will detect these dangerous gases would have a large number of applications and would considerably enhance the safety of such environments.

The prior art methods for this purpose have involved the use of catalytic combustion devices and methods which depend upon the variable thermal conductivity of different concentrations of gaseous mixtures. The instrument utilized in the catalytic combustion method requires a catalytic filament. This type of instrument has a value only in a limited range of gas mixtures and it is intended primarily for use only in the zero to lower explosive limit range. Other disadvantages are that when the filament is exposed to combustible mixtures for a long period of time, the instrument has a tendency to zero drift and contact with rich mixtures considerably reduces the life of the filament. The devices which involve the thermal conductivity method must be carefully screened and proper operation of the instrument requires a knowledge of the gas composition.

This invention which avoids the defects of the prior methods and devices for sensing and indicating a combustible gas mixture is one which can be utilized in all ranges of concentration, and has no parts of short life, nor does it require careful handling and operation. Our device makes use of the temperature rise of gas after a combustion process. The temperature rise in a combustion process is a function of the heating value of the fuel, the design of the combustion chamber and the concentration of the mixture. The heating values of contemporary fuels are very nearly constant. The combustion chamber design is governed not only by the desired shape of the chamber but also by the pressure level and velocity head of the mixture. With a properly designed combustion chamber the velocity head and shape of the chamber can be controlled so as to yield a constant value of combustion efficiency. If the pressure level and/or temperature of the sample gas are very much different from atmospheric, it is proposed to condition the sample to atmospheric conditions. Thus the temperature rise of a gas could be related to the concentration of the gas.

Therefore, it is an object of this invention to provide a device which will instantaneously indicate the concentration of a gas mixture in terms of its lower and/or upper explosive limit or in the alternative indicate whether the mixture is combustible.

It is another object of this invention to provide a simple, rugged and durable device for the combustion of gas mixtures so that their combustibility may be determined.

It is still another object of this invention to provide a device for determining the combustibility of gas mixtures which utilizes the heating value of a gas mixture as a measure of its combustibility.

It is a further object of this invention to provide a device for determining the combustibility of a gas mixture which utilizes the temperature rise when a gas sample is burned to thereby ascertain its heating value and combustibility.

It is a still further object of this invention to provide an apparatus for burning a sample gas mixture and measuring the temperature rise whereby its combustibility may be determined.

These and other objects and many of the attendant advantages of this invention will be readily appreciated as the same becomes better understood by reference to the following detailed description when considered in connection with the accompanying drawings wherein:

Figure 1 is a block diagram of the entire device.

Figure 3 is a side view in cross section of the burner assembly.

Figure 2:
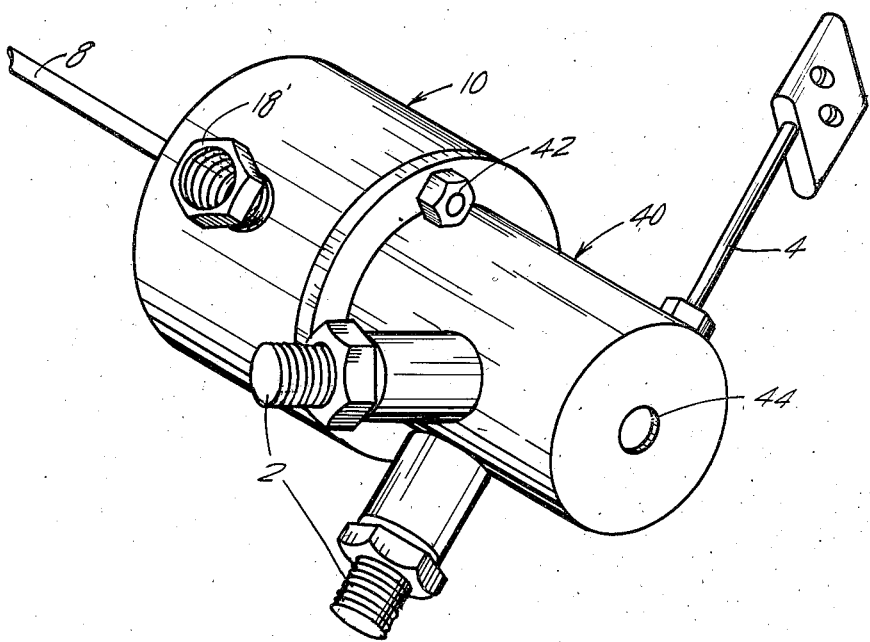
Figure 2 is an isometric view of the burner assembly.

In Figure 1 there is shown a schematic presentation of a means for carrying out the method outlined above. The manner and elements of the means which are to be used in a given instance depend upon the explosive range of the gas mixture and it will be found that in a given situation one range will be present and the detecting and indicating means can be set-up to operate permanently according to the needs of the particular range.

The complete device comprises of a burner assembly 1 which is described in greater detail below. A spark plug or other suitable ignition means 2 is mounted on the burner and is supplied by a source of electrical energy as at 3. Inserted into the combustion means 1 is a thermocouple 4 which detects the temperature increase during a combustion process. A fuel or sample mixture supply 5 is connected to the burner by conduit 6 and can meter through an orifice or other suitable means 6' a measured quantity of fuel. An air or sample supply mixture 7 is also connected to the burner 1 by conduit 8 and can meter by means of the orifice or other suitable means 8' a measured quantity of air or sample mixture.

As related above, the manner in which this system is operated depends upon the normal explosive range of its environment. If it is intended that the detecting and indicating system should function in a situation of a normally zero to lower explosive range, then the operation is as follows: A measured quantity of fuel from the reservoir 5 is added to a known quantity of the gas mixture which it is desired to test and which may be held for use in the air reservoir 7. This results in a combustible mixture which is ignited in the burner means 1 by means of the spark plug 2. The products of combustion are cooled with a known quantity of the gas mixture being tested and the difference in temperature of the original sample gas mixture and the temperature of the mixture of fuel and gas sample after combustion cooled by the additional sample gas is detected by the thermocouple 4 and presented on the indicator 9. The indicator may be calibrated in any manner for presenting the desired information. It has been found convenient to calibrate it from 0% to 100% of explosive mixture so that a rapid presentation of the possibility of explosion is available.

The fuel is added to the sample gas mixture when operating in this low range as the gas mixture itself, being rather lean, does not support combustion too well. Additional sample mixture after combustion acts as a coolant to maintain a lower temperature increasing the operating life of the burner. It has been found also that some very small percentage of the coolant sample mixture is burnt and the sensitivity of the device is thereby increased.

The method of operation of the system in the lower to high explosive range is as follows: A known quantity of the sample gas is burned in the combustion chamber and is cooled with a known quantity of air containing no gas mixture. The temperature rise of the sample gas before combustion and after combustion and cooling by the air is detected by the thermocouple 4 and transmitted to the indicator which may be calibrated as set out above. The air in this instance is added only to prevent excessive temperatures in the combustion device.

In analyzing gas mixture above the high explosive limit a known quantity of the sample gas is mixed with a known quantity of air of zero gas concentration, the air being added since the gas mixture itself does not contain sufficient oxygen to support combustion. This mixture of gas and air is cooled after combustion with another known quantity of air, again to prevent excessive temperature rise, and the temperature detected and indicated.

The apparatus, therefore, remains basically the same under the three different range conditions, it is only the air, fuel and sample mixtures in tanks 5 and 7 that are altered. It is contemplated that in the first range (the zero to the lower explosive range), tank 5 contains fuel while tank 7 contains only the sample mixture. In the medium range, either the sample mixture only is used for both cooling and burning and is stored in tank 7, or the sample mixture is stored in tank 5 for combustion purposes only and cooling air is stored in tank 7 for cooling purposes. While in the high explosive range, either tank 5 accommodates a sample mixture together with a fixed quantity of air and tank 7 stores air for cooling only, or the sample mixture is in tank 5 and the air kept in tank 7 is used for both cooling and burning.

In each of the above ranges, a basic calibration must be made within the specific range with known sample mixtures. In each range of testing, the only unknown is the sample mixture content or percentage combustibility, as the amount of fuel added, the amount of air added, the cooling effect etc. are all known or fixed quantities.

Thus it is seen that there has been described a device and method for the sensing and indicating of the concentration of gas mixtures in terms of their explosive limits. The apparatus and basic method are the same for all ranges and vary as explained above according to the needs of the particular range.

The combustion device or burner assembly forming a part of this invention is illustrated in detail in Figures 2 and 3. Designated generally by reference 1 the burner assembly comprises two parts, a mixing chamber housing 10 and a combustion chamber housing 40.

The housing 10 is in the form of a cylinder with a side wall 12 and end wall 14 forming a chamber 16. The side wall 12 has a partially threaded passage 18 formed therein which receives the threaded bushing 18' to connect and position conduit 8 to the housing. The end 14 is formed with a threaded passage 20 which receives the threaded bushing 22 connecting and properly positioning the conduit 6 in the housing. Mounted in the housing 10 is mixing chamber 24 which has a hole 26 in one end communicating with the end of the conduit 6 and holes 28 in its side which communicate with the chamber 16 and thereby the conduit 8 through the passage 18. The chamber 24 has a flange 30 formed on one end thereof. Formed on the interior of the wall 14 is a boss 32 on which is mounted the spring 34 which abuts the flange 30 at its other end. The spring functions to properly position the chamber 24 in the housing when the combustion device is assembled. Mounted in the interior of the chamber 24 is a diffuser 36 formed of a rigid porous material which is held in position by the shoulder means 38 and aids in the mixing of gas and air or gas and fuel.

A housing 40 for the combustion chamber is mounted on the mixing chamber housing 10 by means of a plurality of bolts 42. Provided in the far end of the housing 40 is an aperture 44 whereby the products of combustion may escape. The combustion chamber is formed of two parts, a main portion 46 and a head portion 48. This is done for ease of fabrication and assembly. A shoulder means 50 aids in the proper positioning of the chamber in the housing. It can be seen that when the housing 40 is assembled on the housing 10 with the chambers 24 and 46 inside the spring 34 pushing against the flange 30 exerts a force holding all the elements in their proper assembled position.

Passing through hole 52 in the main chamber portion 46, a hole 54 in the housing 40 and held in position by the threaded bushing 71 is the thermocouple 4 which extends into the path of the gases being burned. A plurality of small holes 56 are formed around the periphery of the chamber for a purpose to be described below. The spark plugs 2 are threaded into the housing as at 58 and extend into the chamber 46 through holes formed therein. The combustion chamber is formed to achieve optimum combustion and has a hole 60 communicating with the interior of the diffuser. The outer diameter of the combustion chamber is less than the inner diameter of the housing 40, leaving an annular passage 62 whereby gas and/or air can be admitted through the holes 56 to the interior of the chamber.

Tanks 5 and 7 are connected to conduits 6 and 8 which in turn are joined to passages 26 and 18 respectively. Meter means 6' and 8' are inserted in lines 6 and 8 and measure the flow therethrough. The meters are conventional rate controlling meters of the rotor meter type, which meters contain a conventional stop-cock to control the flow. Since such meters are conventional, they have been illustrated diagrammatically.

In the operation of the system the burner functions as follows: When operated in the low range fuel passes through conduit 6, the metering means 6' and the hole 26 into the interior of the mixing chamber. The sample mixture passes through conduit 8, metering means 8' and holes 28 to the interior of the mixing chamber where it is mixed with the incoming fuel and is further mixed by the action of the diffuser 36 through which both the fuel and mixture pass. The fuel and mixture then pass through the passage 60 into the combustion chamber where they are ignited by the spark plugs 2. Meanwhile some portion of the sample mixture passes from the chamber 16, through the annular passage 62 and through the holes 56 wherein it serves as the known quantity of sample mixture added after combustion. The known quantity is determined because the dimensions of the various passages in the lower assembly are known and the flow therethrough can be calculated. This of course is done beforehand and is taken into consideration in the calibration of the temperature indicator.

Since the amount of fuel added, the amount of cooling action occurring, and the amount of sample mixture added are known factors, the only unknown is the percent concentration. Upon combustion, a temperature will be reached which will correspond with some known calibration temperature. Since the temperature indicator is calibrated in percent concentration, a visual means is provided for fast, accurate determination of the concentration of gas mixture in terms of its explosive qualities.

When the device, on the other hand, is used in the middle range of explosive concentration, two different methods, but both basically similar, may be used. In the first method, the sample mixture is entrained in tank 7 and the fuel is cut off from tank 5. A portion of the sample mixture, consequently, enters the combustion chamber via ports 18, 28, through the filter 36 and passage 60; at the same time, the remainder of the mixture enters into the combustion chamber via passage 62 and ports 56 to cool the combustion products just before the temperature indicator.

The second method in the middle range has a sample mixture in tank 5 and air in tank 7. Only the sample mixture is burned in the combustion chamber as ports 28 are blocked off by plugs such as is shown by plug 70 of Fig. 3. As a result, the air is used solely for cooling purposes. After burning in the combustion chamber, the products of combustion are cooled by the air and the temperature of the air and combustion products is recorded on the indicator.

In the final or high range of concentration, two basically identical methods are also available. In the first, the set-up is the same as the latter set-up in the middle range, i. e. the air and sample mixture set-up. In this case, however, the ports 28 are unblocked and the air partakes in the combustion process after mixing with the sample mixture in the diffuser 36 and the associated passage.

The second method in the high range of concentration has a fixed quantity of air and a sample mixture in tank 5, air alone in tank 7, and the ports 28 blocked. The mixed air and sample mixture from tank 5 passes through the rate meter and diffuser and burns in the combustion chamber. The combustion products are cooled by the air entering the chamber through ports 56.

From the foregoing it can be seen that there has been provided a simple device having no parts subject to wearing out which can be used in the method we have provided for the sensing and measuring of combustible gases.

Obviously many modifications and variation of the present invention are possible in the light of the above teachings. It is therefore to be understood that within the scope of the appended claims the invention may be practiced otherwise than as specifically described.

What is claimed is:

1. A burner assembly comprising a housing, means comprising a first chamber within said housing, means comprising a mixing chamber located within said first chamber means, combustion chamber means within said housing, said combustion chamber being connected to said mixing chamber and the combustion chamber, means to add fuel into the mixing chamber, connecting means between the first chamber and the mixing chanmber, and means to add a sample gas mixture into said first chamber whereby the mixture flows through said connecting means and into the mixing chamber.

2. A burner assembly comprising a housing, means comprising a first chamber within said housing, means comprising a mixing chamber located within said first chamber means, combustion chamber means within said housing, said combustion chamber being connected to said mixing chamber, by-pass conduit means joining said first chamber and the combustion chamber, means to add a sample gas mixture into said mixing chamber and combustion chamber, means to burn said gas in the combustion chamber and means to add a cooling gas into said first chamber whereby said cooling gas enters the combustion chamber via said by-pass means to cool the products of combustion therein.

3. A burner assembly comprising a housing, means comprising a first chamber within said housing, means comprising a mixing chamber located within said first chamber means, combustion chamber means within said housing, said combustion chamber being connected to said mixing chamber, by-pass conduit means joining said first chamber and the combustion chamber, said mixing chamber and first chamber having a passageway therebetween connecting the mixing chamber and the first chamber, means to add a gas into said first chamber, said gas flowing into said mixing chamber and burning in said combustion chamber, and also passing through said by-pass means into the combustion chamber to cool the products of combustion, and means to record the temperature of the mixture of the products of combustion and the cooling gas.

4. A burner assembly comprising a housing, means comprising a first chamber within said housing, means comprising a mixing chamber located within said first chamber means, combustion chamber means within said housing, said combustion chamber being connected to said mixing chamber, by-pass conduit means joining said first chamber and the combustion chamber, said mixing chamber and first chamber having a passageway therebetween connecting the two chambers, means to add a sample gas mixture into said mixing chamber, means to add a second gas into said first chamber, and means to ignite the new mixture of gas and sample gas mixture.

5. A burner assembly comprising a housing, means comprising a first chamber within said housing, means comprising a mixing chamber located within said first chamber means, combustion chamber means within said housing, said combustion chamber being connected to said mixing chamber, by-pass conduit means joining said first chamber and the combustion chamber, said mixing chamber and first chamber having a passageway therebetween connecting the two chambers, means to control the flow through said passageway, means to add a fluid comprising at least a sample gas mixture into said mixing chamber, and means to add a gas into said first chamber, said second gas entering at least the by-pass conduit.

References Cited in the file of this patent

UNITED STATES PATENTS

| | | |
|---|---|---|
| 1,625,277 | Packard | Apr. 19, 1927 |
| 1,827,930 | Bissell | Oct. 20, 1931 |
| 2,001,114 | Schmidt | May 14, 1935 |
| 2,083,521 | Miller | June 8, 1937 |
| 2,329,459 | Dickey | Sept. 14, 1943 |
| 2,349,517 | Pinkerton | May 23, 1944 |
| 2,586,899 | Yanikoski | Feb. 26, 1952 |